(12) United States Patent
Morris et al.

(10) Patent No.: US 10,905,090 B2
(45) Date of Patent: Feb. 2, 2021

(54) DEVICES FOR CONTROLLING THE MOVEMENT OF SMALL ANIMALS THROUGH FENCES

(71) Applicant: Ertec Environmental Systems LLC, Alameda, CA (US)

(72) Inventors: Vincent P. Morris, Oakland, CA (US); Richard H. Sherratt, Alameda, CA (US)

(73) Assignee: ERTEC ENVIRONMENTAL SYSTEMS LLC, Alameda, CA (US)

( * ) Notice: Subject to any disclaimer, the term of this patent is extended or adjusted under 35 U.S.C. 154(b) by 0 days.

(21) Appl. No.: 16/838,933

(22) Filed: Apr. 2, 2020

(65) Prior Publication Data

US 2020/0396956 A1 Dec. 24, 2020

Related U.S. Application Data

(60) Provisional application No. 62/812,223, filed on Feb. 28, 2019.

(51) Int. Cl.
*A01K 1/00* (2006.01)
*A01M 23/08* (2006.01)

(52) U.S. Cl.
CPC ........... *A01K 1/0017* (2013.01); *A01M 23/08* (2013.01)

(58) Field of Classification Search
CPC .................................................. A01M 23/08
USPC ............................................................ 43/65
See application file for complete search history.

(56) References Cited

U.S. PATENT DOCUMENTS

| | | | | |
|---|---|---|---|---|
| 2,930,353 | A * | 3/1960 | Sievers ................ | A01K 1/0017 119/841 |
| 3,465,724 | A * | 9/1969 | Broadbent ........... | A01K 11/006 119/51.02 |
| 3,803,763 | A * | 4/1974 | Reed .................... | A01K 1/0017 49/49 |
| 4,216,743 | A * | 8/1980 | Cohen ................. | E06B 7/32 119/484 |
| 8,402,630 | B2 * | 3/2013 | McGinn ................ | A01K 3/00 29/525.01 |
| 8,826,594 | B2 * | 9/2014 | Graves .................. | E05B 65/06 49/169 |
| 8,839,556 | B2 * | 9/2014 | Brooks .................. | E05B 65/06 49/163 |
| 2006/0252366 | A1 * | 11/2006 | Eu ............................ | E06B 7/32 455/3.06 |
| 2010/0101503 | A1 * | 4/2010 | Epling ................. | A01K 1/0017 119/512 |
| 2019/0003203 | A1 * | 1/2019 | Swensson ............... | E04H 17/16 |

FOREIGN PATENT DOCUMENTS

GB 2270455 A * 3/1994 ............ A01M 23/08

* cited by examiner

*Primary Examiner* — Christopher P Ellis
(74) *Attorney, Agent, or Firm* — T. H. P. Richardson

(57) ABSTRACT

A control device which, when it is installed as part of a fence, allows a small animal to pass from a first side of the fence to the other side of the fence, but prevents an animal which has passed through the device from returning to the first side of the fence. The control device can comprise (1) a mouth which (i) is exposed on the first side of the fence and (ii) has an open cross-section, and (2) an extending passage which extends away from the mouth to an exit. The extending passage can narrow as it extends from the mouth to the exit.

18 Claims, 5 Drawing Sheets

DEVICES FOR CONTROLLING THE MOVEMENT OF SMALL ANIMALS THROUGH FENCES

CROSS-REFERENCE TO RELATED APPLICATIONS

This application claims priority from and the benefit of U.S. Provisional Application No. 62/812,223, filed Feb. 28, 2019, by Vincent P. Morris. This application is also related to U.S. Pat. Nos. 6,848,866, 7,008,144, 7,131,787, 7,172,372, 7,544,016, 7,955,030, 8,402,630 and 10,335,724. The entire disclosure of each of those Patents and that application is incorporated by reference herein for all purposes.

BACKGROUND OF THE INVENTION

Fences can be used to control the movement of animals into and/or out of a defined area, e.g. a construction site. A wide variety of fences have been used for this purpose, for example fences made of solid materials and/or wire mesh, or, as is preferred, a material which comprises a plurality of polymeric strands which are joined together at the crossover points to create small openings. U.S. Pat. No. 8,402,630 describes and claims a variety of fences which are specifically designed to control the movement of small animals.

SUMMARY OF THE INVENTION

In a first aspect, this invention provides a control device which can be part of a fence which, in the absence of the control device, prevents the passage of small animals. The control device, when it is part of the fence, permits some small animals to pass from a first side of the fence to the other side of the fence, but makes it difficult or impossible for an animal which has passed through the device to return to the first side of the fence. The need for such a control device has not previously been recognized. A fence containing one or more of the control devices can be used to enable the escape of a protected species from a designated area, for example a construction site. The term "small animal" is used herein to include vertebrates and invertebrates, for example salamanders, snakes, turtles, rabbits and mice.

A preferred control device of the first aspect of the invention is a device which comprises (1) a mouth which has an open cross-section and (2) an extending passage which (i) has a closed cross-section, (ii) extends away from the mouth and (iii) ends at an exit. Preferably, at least part of the extending passage has a smaller cross-section than the mouth. The device can be installed as part of a fence, with the mouth exposed on a first side of the fence and the extending passage extending away from the first side of the fence. When the device is installed, the mouth is exposed on the side of the fence which will be approached by the animal (hereinafter the first side of the fence), and the extending passage extends away from the other side of the fence. The control device is constructed and/or installed so that an animal, after it has entered the mouth, can escape through the extending passage, but, after it has escaped, cannot return through the device to the first side of the fence. In one embodiment, the exit of the extending passage is open but is above ground level so that is difficult for an animal to reenter the control device. The level of the ground at the end of the extending passage can be reduced for this purpose. In another embodiment, the extending passage includes a flap which is pushed aside by the animal as it passes through the extending passage, but closes behind the animal to ensure that the animal cannot return.

In a second aspect, this invention provides an assembly which comprises (1) a fence which prevents small animals from passing through it and which has a base at or close to ground level, and (2) a control device according to the first aspect of the invention, with the base of the mouth of the control device at or close to ground level. The control device can be attached to a hole in the fence before or after the fence has been installed; alternatively, the control device can be an integral part of a fence, the fence optionally having the same height as the mouth of the control device.

In a third aspect, this invention provides a method of constructing an assembly according to the second aspect of the invention, the method comprising (1) making a hole in a fence, before after the fence is installed, and (2) attaching the mouth of a control device according to the first aspect of the invention to the hole in the fence, with the base of the mouth at or near ground level.

BRIEF DESCRIPTION OF THE DRAWINGS

The invention is illustrated in the accompanying diagrammatic drawings, which are not to scale, and in which.

DETAILED DESCRIPTION OF THE INVENTION

Figure 1:
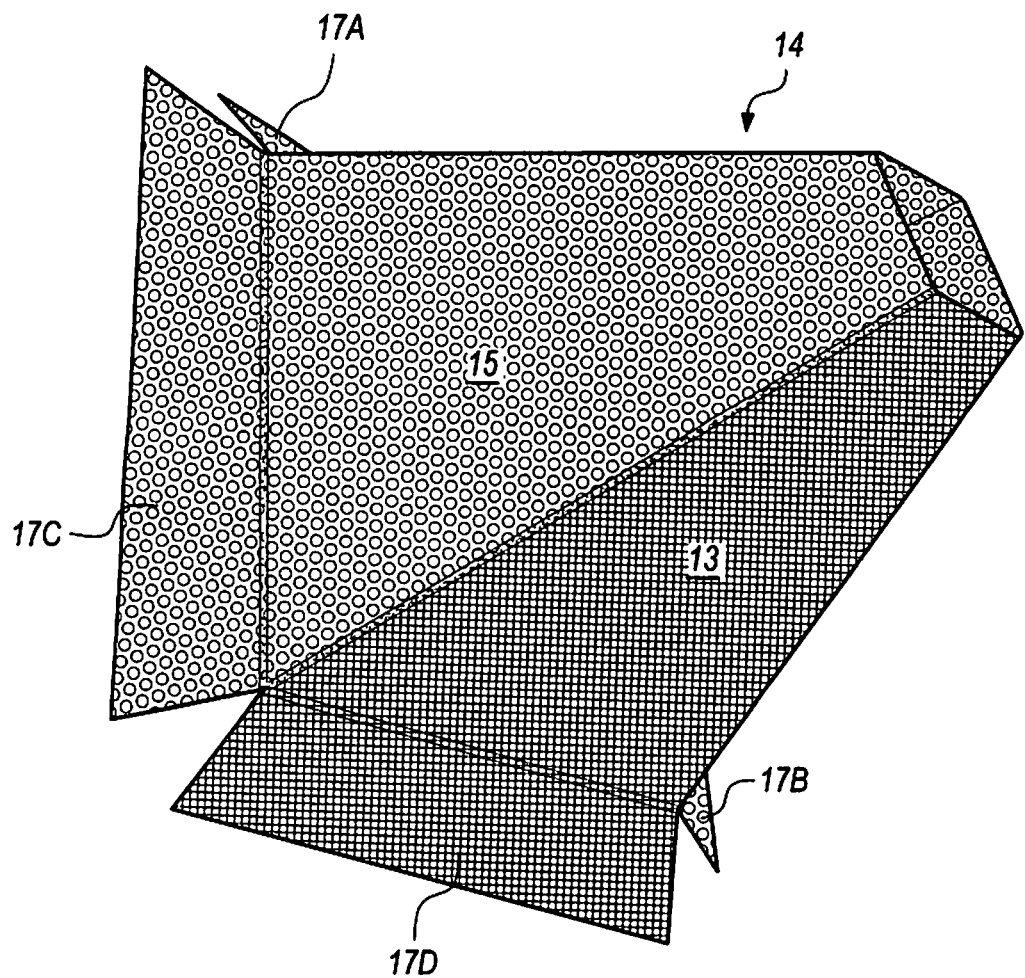
FIG. 1 is a perspective front view of an exemplary control device of the invention.
Figure 2:
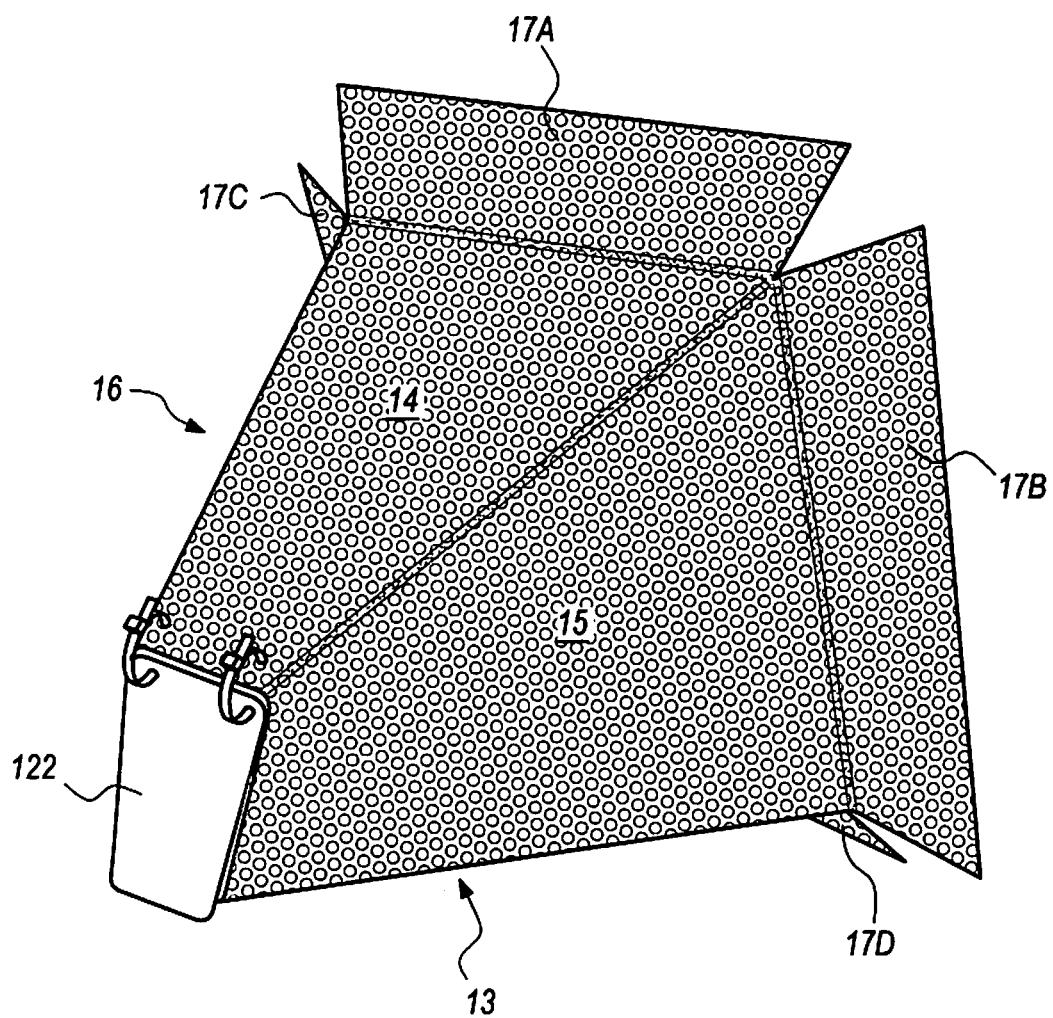
FIG. 2 is a perspective rear view of another exemplary control device of the invention.
Figure 3:
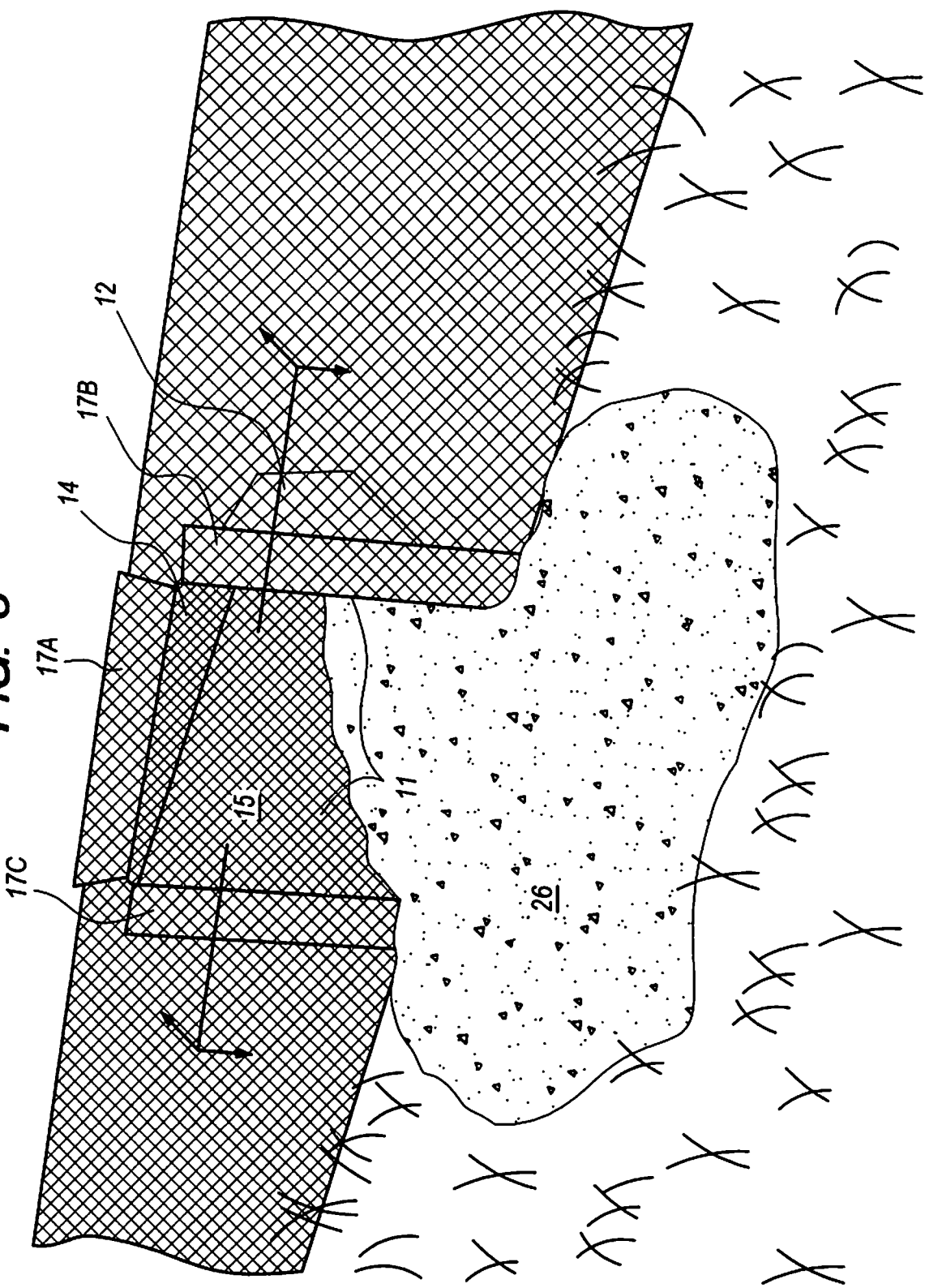
FIG. 3 is a perspective front view of a portion of a fence to which an exemplary control device of the invention has been attached, with a ramp comprising soil leading through the mouth of the control device into the device.
Figure 4:
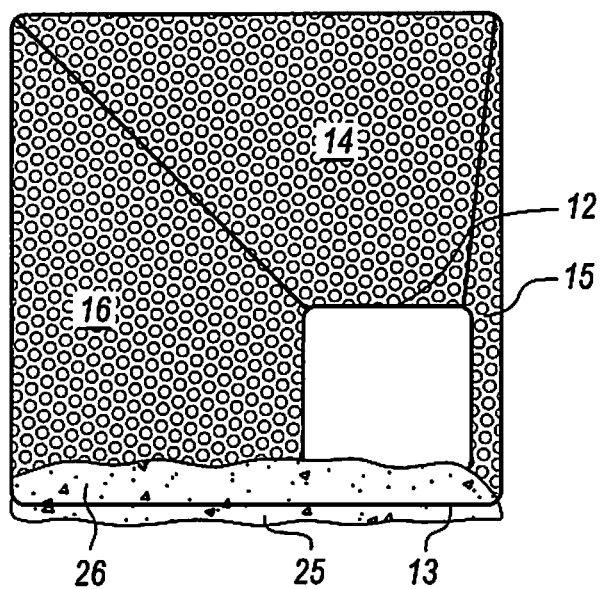
FIG. 4 is a cross-sectional view of the control device in FIG. 3.
Figure 5:
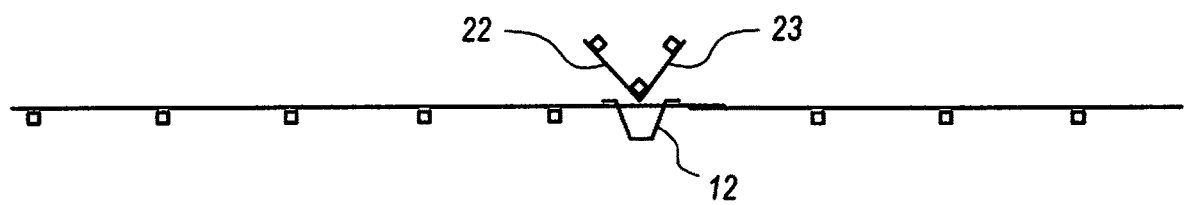
FIG. 5 is a top view of an exemplary fence having a control device attached thereto, showing auxiliary fences to guide an animal into the mouth of the control device.
Figure 6:
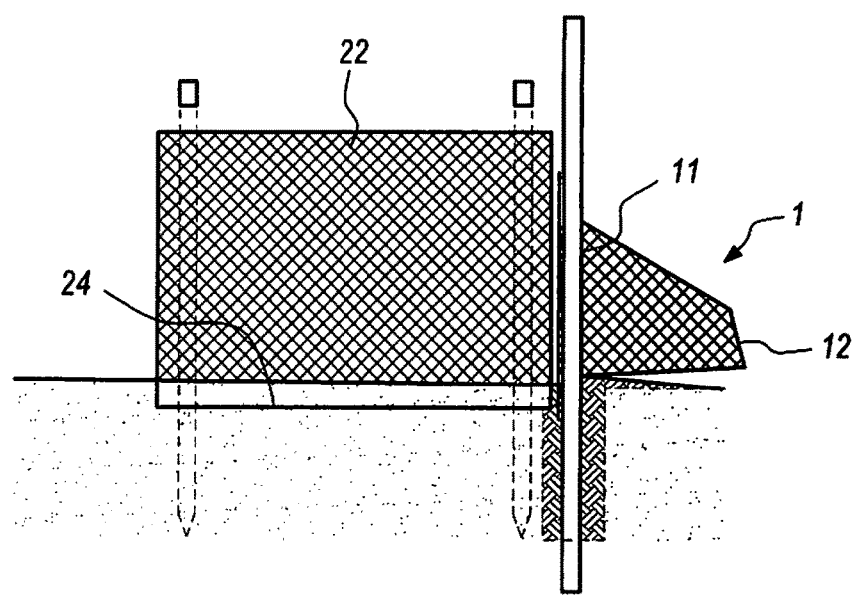
FIG. 6 is a side view of FIG. 5.

In the Summary of the Invention above, the Detailed Description of the Invention, the Examples, the Statements, and the claims below, and in the accompanying drawings, reference is made to particular features of the invention, including for example components, ingredients, devices, apparatus, systems, test results and steps. It is to be understood that the disclosure of the invention in this specification includes all possible combinations of such particular features. For example, where a particular feature is disclosed in the context of a particular mode, aspect, embodiment, Figure, claim or statement, that feature can also be used, to the extent possible, in the context of any other particular mode, aspect, embodiment, Figure, claim or statement, and in the invention generally. The invention disclosed and claimed herein includes embodiments not specifically described herein and can for example make use of features which are not specifically described herein but which provide functions which are the same, equivalent or similar to, features specifically disclosed herein.

The term "comprises" and grammatical equivalents thereof are used herein to mean that other features are optionally present. For example, a device "comprising" (or "which comprises") components A, B and C can contain only components A, B and C, or can contain not only components A, B and C but also one or more other components. Where reference is made herein to a method comprising two or more defined steps, then, unless the context requires otherwise, the defined steps can be carried out in any order or simultaneously, and the method can include one or more other steps which are carried out before any of the defined steps, between two of the defined steps, or after all the defined steps. The term "at least" followed by a number is used herein to denote the start of a range beginning with that number (which may be a range having an upper limit or no upper limit, depending on the variable being defined). For example, "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example, "0.5-3" means a range whose lower limit is 0.5, and whose upper limit is 3. The numbers given herein should be construed with the latitude appropriate to their context and expression. The terms "plural" and "plurality" are used herein to mean two or more. When reference is made herein to "a", "an", "one" or "the" feature, it is to be understood that, unless the context requires otherwise, there can be one or more than one such feature.

Where reference is made herein to two or more components (or parts or portions etc.), it is to be understood that the components can be, unless the context requires otherwise, separate from each other or integral parts of a single structure or a single component acting as the two or more specified components.

When, in the description and claims below, references are made to the base of the device, the front face of the device, or the sides of the extending passage of the device, or the exit from the extending passage, those references apply to the device when it is installed as part of a fence, with the base of the device being at or close to ground level and being generally horizontal.

The control devices of the invention optionally include the following exemplary features, one or more of which may be used in combination, except where such combination is impossible.
(A) At least part of the extending passage has a smaller cross-section than the mouth.
(B) The mouth is defined by the base of the device and components of the extending passage.
(C) The mouth is part or all of the front face of the device.
(D) The mouth of the control device has a cross-sectional area of up to 300 in.$^2$ or up to 256 in.$^2$, e.g. 16-256 in.$^2$ or 16-100 in.$^2$, for example 24-40 in.$^2$, the mouth having for example a base and three sides, each of the base and the sides being for example 4-16 inches, or 4-10 inches, or 4-8 inches in length.
(E) The exit of the extending passage has a cross-sectional area which is less than one half, e.g. less than one third, of the cross-sectional area of the mouth, e.g. 36-100 in.$^2$ or 16-32 in.$^2$, the exit for example having four sides each of which is 4-10 inch in length.
(F) The extending passage is constructed and/or installed so that an animal, after it has passed through the mouth, can escape through the extending passage, but, after it has escaped, cannot return through the device. In one embodiment, the extending passage can include a flap which is pushed aside by the animal as it passes through the extending passage, but closes behind the animal to ensure that the animal cannot return. The flap can be at or near the end of the extending passage, and have a top edge which is hinged at the top and a bottom edge at or close to the bottom of the extending passage. Alternatively or additionally, the device is installed so that the exit from the extending passage is above ground level, making it difficult for an animal to reenter the extending passage.
(G) When the fence comprises a material which comprises a plurality of polymeric strands which are joined together at the crossover points to create small openings, the control device can be constructed of the same material as the fence, or a different material which comprises a plurality of polymeric strands joined together at crossover points to create small openings. Details of such materials can be found in the documents incorporated by reference herein.
(H) The control device can be made of any suitable material, bearing in mind that the control device is going to be subject to environmental exposure. The material is preferably one which will not be damaged by, or will damage, animals that may pass through it. The control device can be made of a material that has multiple apertures so that the extending passage is open to ambient light. Alternatively, part or all of the control device can be made of an opaque material, the opaque material optionally having openings therein.
(I) The extending passage of the control device has a base, preferably a substantially flat base, and one or more components which extend from the edges of the base to form the extending section. The component or components can be of any shape, e.g. flat or curved. In one embodiment, the components are three or more flat sides, at least two of which, and preferably all of which, decrease in size to form, with the flat base, an extending passage having a cross-section which decreases from the open mouth to an opening. The resulting extending passage can have a four-sided cross-section whose area reduces (the reduction being preferably, but not necessarily, regular) from the mouth to the end of the extending section. In another embodiment, there is a single curved component, for example a component having a cross-section which is wholly or partially circular.
(J The control device can comprise components that facilitate its attachment to a hole in a fence, before or after the fence is installed. The components can for example be two or more flanges which extend away from the open mouth. The flanges can be secured to the fence with polymeric ties if the assembly is not expected to remain in place for a long period, or with galvanized wire for long-term exposure.
(L) The control device can comprise a geotextile material which is underneath the base of the device, and which optionally extends beyond the mouth of the device, to facilitate the construction of a ramp which comprises soil and which leads into the device, as for example further described below.

The assemblies of the invention optionally include the following features, one or more of which may be used in combination, except where such combination is impossible.
(A) The assembly can include auxiliary fences which guide an animal into the mouth of the control device. The fences can for example be 4-20 inches e.g. 8-15 inches high, and 12-20 inches long. In one embodiment, two vertical auxiliary fences extend in a generally V-shape from the primary fence, are at an angle of 30-120°, e.g. about 90°, to each other, and are joined together at an apex near the mouth of the device. The auxiliary fences can be supported by vertical posts which do not obstruct the mouth of the device. The base of each auxiliary fence can be placed in a trench which can for example be 1-4 inch deep, e.g. about 2 inch deep, and which is backfilled to secure the base of the auxiliary fence. The auxiliary fences guide an animal, for example an animal which is following generally along the fence line, into the mouth of the control device.

(B) The assembly can include a ramp leading up to, and preferably extending through the mouth and over the base of the control device into the extending passage. This encourages an animal to pass through the mouth of the device. In one embodiment, the base of the device contains apertures and there is a geotextile material underneath the base of the device. A ramp comprising soil or other debris can be manually constructed so that the ramp extends outwards from the mouth of the device and inwards over the base. The combination of a base having apertures, a geotextile material underneath the base and soil over the base results in a ramp which can remain effective even if the assembly is subject to rain.

(C) The exit of the extending passage can be above ground level, for example 2-3 inches above ground level; the level of the ground at the exit of the extending passage can be reduced for this purpose.

The methods of the invention optionally include the following features, one or more of which may be used in combination, except where such combination is impossible. The method can comprise: —

(A) (1) Making a hole in a fence which is ready to be installed, the hole being made at the level of the fence which will be at ground level when the fence is installed, or making a hole at ground level in a fence which has already been installed, and (2) attaching the control device to the hole in the fence.

(B) Installing a plurality of the control devices along the length of a fence, at distances that can be 50-200 feet apart, for example 150 feet apart.

(C) Installing auxiliary fences as described above.

(D) Creating a ramp as described above.

The following numerals are used to identify the various components in the Figures.
- 1 the funnel.
- 11 the mouth of the funnel.
- 12 the exit of the funnel.
- 122 a flap which is hinged to the top of the exit 12 and which can be pushed outwards by an animal escaping through the exit of the funnel.
- 13, 14, 15, 16 the base (13), the top (14) and the walls (15, 16) of the extending passage.
- 17A, 17B, 17C, 17D flanges around the mouth of the funnel.
- 22, 23 auxiliary fences.
- 24 trench for base of auxiliary fence.
- 25 geotextile material underneath the base of the funnel.
- 26 ramp comprising earth leading up to and through the mouth of the funnel and over the base of the funnel.

The invention claimed is:

1. A control device which can be installed at or close to ground level as part of a fence which is configured to prevent the passage of small animals from an interior first side of said fence to an opposite exterior side of said fence, the device comprising:—
  a. an open mouth which has a flat base and an open cross-section and
  b. a passage which has a closed cross-section, extends away from said open mouth and ends at an exit; said mouth being connectable by flanges to the fence, wherein said device allows a small animal to pass through the device from said first side of the fence to said opposite exterior side of the fence and provides means to prevent said animal from returning to said first side.

2. A control device according to claim 1 wherein at least part of the extending passage has a smaller cross-section than the mouth.

3. A control device according to claim 1 wherein the extending means to prevent said animal from returning includes a flap which is pushed aside by the animal as it passes through the passage, but closes behind the animal to ensure that the animal cannot return.

4. A control device according to claim 1 which is constructed of a material which comprises a plurality of polymeric strands which are joined together at crossover points to create small openings.

5. A control device according to claim 1 at least part of which is constructed of an opaque material.

6. A control device according to claim 5 wherein the opaque material is perforated.

7. A control device according to claim 1 wherein the passage has a flat base and three flat sides, each of the base and the sides decreasing in size to form a four-sided passage having a cross-section which decreases from the open mouth to the exit of the passage.

8. A control device according to claim 1 wherein the mouth has a cross-sectional area of 16-256 in.$^2$ and the end of the passage has a cross-sectional area which is less than one half of the cross-sectional area of the mouth.

9. A control device according to claim 8 wherein the mouth has a cross-sectional area of 16-256 in.$^2$ and the end of the passage has a cross-sectional area which is less than one third of the cross-sectional area of the mouth.

10. A control device according to claim 1 wherein the mouth is defined by the base of the device and the sides of the passage.

11. A control device according to claim 1 wherein said flanges extend away from the open mouth.

12. A control device according to claim 1 wherein the base of the device comprises apertures and wherein there is geotextile material underneath the base of the device.

13. An assembly which comprises
  (1) a fence which prevents small animals from passing through it and which has a base at ground level, and
  (2) a control device according to claim 1, the mouth of the control device being attached to the fence, and the base of the control device being at or near ground level.

14. An assembly according to claim 13 which includes auxiliary fences to guide an animal towards the mouth of the control device.

15. An assembly according to claim 13 wherein the exit of the passage is above ground level.

16. An assembly according to claim 13 wherein (i) the base of the device comprises apertures, (ii) there is a sheet of geotextile material between the base of the device and the ground, and (iii) there is a ramp comprising soil which extends away from the mouth of the device and into the passage.

17. A method of constructing an assembly according to claim 13, the method comprising
  (1) making a hole at ground level in an installed fence, and
  (2) attaching the mouth of a control device according to claim 1 to the hole in the fence, the mouth having a base at or near ground level.

18. A method of constructing an assembly according to claim 13, the method comprising (1) providing a fence having a hole at ground level and a control device attached to the hole, and
(2) constructing a ramp comprising soil which extends away from the mouth of the device and into the passage of the device.

* * * * *